United States Patent
Hashimoto

(10) Patent No.: US 8,988,722 B2
(45) Date of Patent: Mar. 24, 2015

(54) COOPERATIVE PROCESSING SYSTEM AND METHOD FOR ACQUIRING DEVICE ATTRIBUTES USING QR CODES AND INTERFACE CONNECTION FUNCTION

(71) Applicant: Takahiro Hashimoto, Kanagawa (JP)

(72) Inventor: Takahiro Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/272,811

(22) Filed: May 8, 2014

(65) Prior Publication Data

US 2014/0333948 A1 Nov. 13, 2014

(30) Foreign Application Priority Data

May 10, 2013 (JP) .................................. 2013-100634
Apr. 25, 2014 (JP) .................................. 2014-090952

(51) Int. Cl.
*G06F 3/12* (2006.01)
*H04N 1/00* (2006.01)

(52) U.S. Cl.
CPC ....... *H04N 1/00127* (2013.01); *H04N 1/00129* (2013.01); *H04N 1/00251* (2013.01); *H04N 1/00267* (2013.01); *H04N 1/00278* (2013.01); *H04N 1/00307* (2013.01); *H04N 1/00403* (2013.01); *H04N 1/00488* (2013.01); *H04N 1/00334* (2013.01); *H04N 1/00411* (2013.01)
USPC .......................... 358/1.15; 358/1.13; 358/408

(58) Field of Classification Search
None
See application file for complete search history.

(56) References Cited

U.S. PATENT DOCUMENTS

| | | | |
|---|---|---|---|
| 8,488,170 B2 | 7/2013 | Takata | |
| 2005/0105135 A1* | 5/2005 | Takahashi | 358/1.18 |
| 2005/0235077 A1 | 10/2005 | Kubota | |
| 2006/0026600 A1* | 2/2006 | Yoshida | 719/310 |
| 2014/0016161 A1 | 1/2014 | Yamada | |
| 2014/0016816 A1 | 1/2014 | Yamada | |

FOREIGN PATENT DOCUMENTS

| | | |
|---|---|---|
| JP | 2005-292903 | 10/2005 |
| JP | 2011-129064 | 6/2011 |
| JP | 2014-016896 | 1/2014 |
| JP | 2014-016897 | 1/2014 |
| JP | 2014-016898 | 1/2014 |
| JP | 2014-016899 | 1/2014 |
| JP | 2014-032661 | 2/2014 |
| WO | WO 2014/010711 A1 | 1/2014 |

* cited by examiner

*Primary Examiner* — Eric A Rust
*Assistant Examiner* — Haris Sabah
(74) *Attorney, Agent, or Firm* — IPUSA, PLLC

(57) ABSTRACT

A cooperative processing system includes an operation terminal and a cooperative processing device connected to each other, and is connectable to a plurality of electronic devices. The cooperative processing system causes one of electric devices to function as an input device to cause electronic data to be input therefrom and one of the electric devices to function as an output device to output the electronic data. The cooperative processing system includes an obtaining unit to obtain input device information to specify the input device and output device information to specify the output device, an input control unit to cause the input device to input electronic data through a first interface according to the input device information, and an output control unit to cause the output device to output the electronic data through a second interface according to the output device information in an format appropriate for the output device.

5 Claims, 13 Drawing Sheets

FIG.10

SCANNER A SELECTED

PLEASE SET SCANNING CONDITIONS

DATA FORMAT : JPG
INTEGRATION : NO
COLOR/MONOCHROME : MONOCHROME
. . . .

FIG.12

| DEVICE | INTERFACE | ADAPTABLE FORMAT |
|---|---|---|
| MFP | FTP, HTTP, SMB | JPEG, PNG, TIFF |
| FAX | SMTP(MAIL) | PDF |
| ... | ... | ... |

FIG.13

| DEVICE | INTERFACE | ADAPTABLE FORMAT |
|---|---|---|
| MFP | LPR, RAW | RPCS, PDF |
| PROJECTOR | HTTP, SMB | JPEG |
| ... | ... | ... |

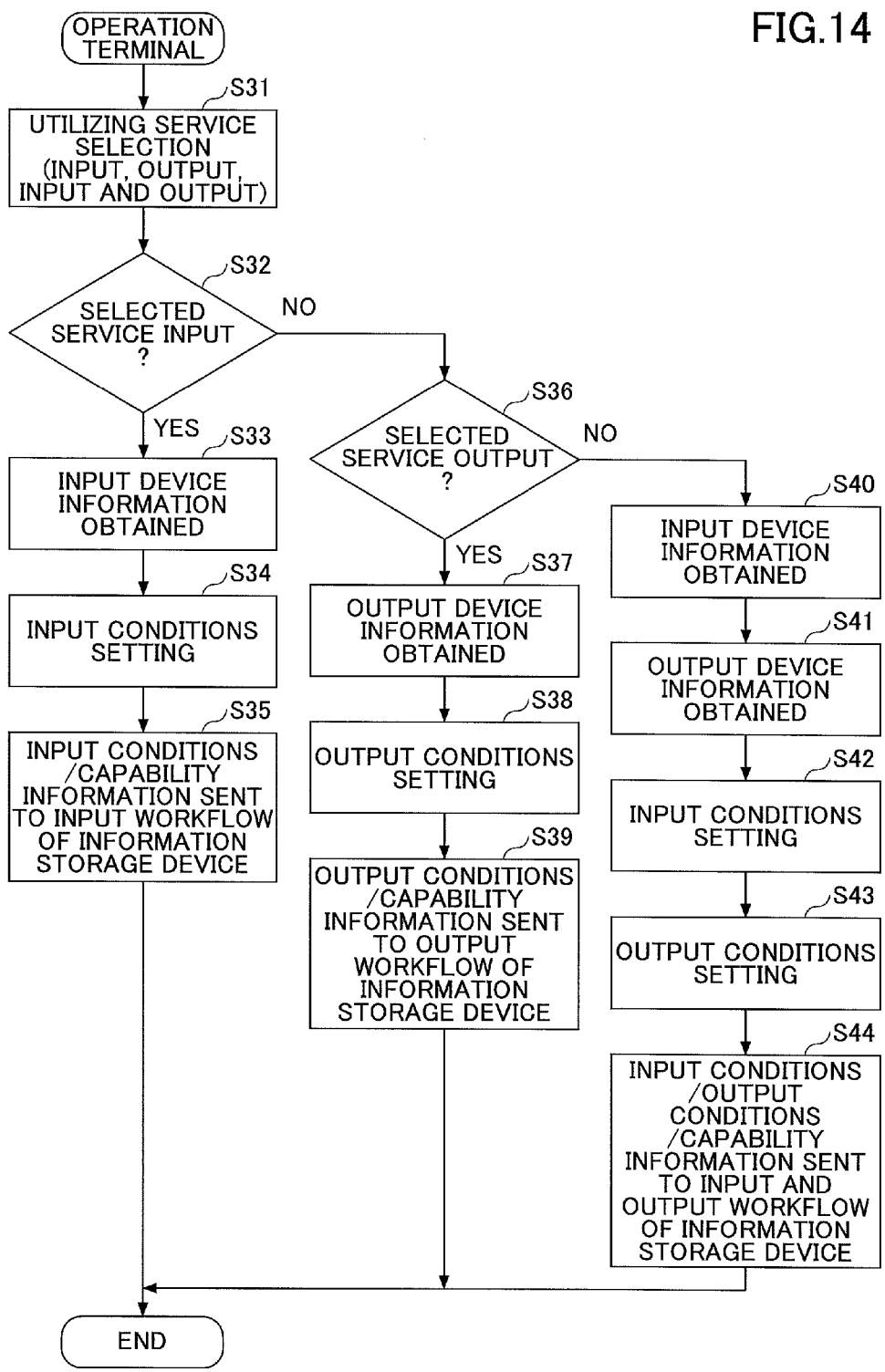

FIG.15

| DEVICE NAME | SETTING ITEM |
|---|---|
| MFP | INPUT:DATA FORMAT/INTEGRATION/COLOR/SCANNED DATA RETAINED OR NOT /USER INSTRUCTION PROVIDED OR NOT OUTPUT:INTEGRATION/BOTH SIDES/COLOR/STAPLED/PUNCHED/TONNER SAVING /USER INSTRUCTION PROVIDED OR NOT |
| SCANNER | DATA FORMAT/INTEGRATION/COLOR/SCANNED DATA RETAINED OR NOT /USER INSTRUCTION PROVIDED OR NOT |
| PROJECTOR | PROJECTION INSTRUCTION/SPECIFIED TERMINAL SETTING |
| PRINTER | INTEGRATION/BOTH SIDES/COLOR/STAPLED/PUNCHED/TONNER SAVING /USER INSTRUCTION PROVIDED OR NOT |
| CAMERA | RESOLUTION/DATA FORMAT/PHOTOGRAPHED DATA RETAINED OR NOT /USER INSTRUCTION PROVIDED OR NOT |
| WHITEBOARD | INPUT:DATA FORMAT/COLOR/DATA RETAINED OR NOT/USER INSTRUCTION PROVIDED OR NOT OUTPUT:OUTPUT INSTRUCTION/SPECIFIED TERMINAL SETTING |

COOPERATIVE PROCESSING SYSTEM AND METHOD FOR ACQUIRING DEVICE ATTRIBUTES USING QR CODES AND INTERFACE CONNECTION FUNCTION

BACKGROUND OF THE INVENTION

1. Field of the Invention

The present invention relates to a cooperative processing system and a cooperative processing method.

2. Description of the Related Art

Conventionally, a control system is known that causes devices connected to a network and handle data having different data formats from each other to cooperate with each other, as disclosed in Japanese Laid-Open Patent Application Publication No. 2005-292903.

In recent years, users are likely to utilize various electronic devices such as a printer, a complex machine, a projector and the like that output electronic data, or various operation terminals such as a mobile phone, a smartphone, a tablet terminal and the like. In a form that utilizes these electronic devices and operation terminals (i.e., a system), improvement of utility value is expected by causing the various electronic devices and operation terminals to cooperate with each other.

However, in the conventional system utilizing the electronic devices and the operation terminals, there has been no structure that provides a plurality of services by causing at least one electronic device among the plurality of electronic devices connected to the system to cooperate with each other.

SUMMARY OF THE INVENTION

Accordingly, embodiments of the present invention may provide novel and useful cooperative processing system and cooperative processing method solving or reducing one or more of the above-described problems.

More specifically, the embodiments of the present invention may provide a cooperative processing system and a cooperative processing method that can provide a plurality of services by causing at least one electronic device among a plurality of electronic devices.

According to one embodiment of the present invention, there is provided a cooperative processing system including an operation terminal and a cooperative processing device connected to each other. The cooperative processing system is connectable to a plurality of electronic devices. The cooperative processing system performs a cooperative process causing one of the plurality of electric devices to function as an input device to cause electronic data to be input therefrom and one of the plurality of electric devices to function as an output device to output the electronic data. The cooperative processing system includes an obtaining unit provided in the operation terminal and configured to obtain input device information from the input device to specify the input device from the plurality of electronic devices and output device information from the output device to specify the output device from the plurality of electronic devices, an input control unit configured to cause the input device specified by the input device information to input electronic data therefrom through a first interface according to the input device information, and an output control unit configured to cause the output device specified by the output device information to output the electronic data through a second interface according to the output device information in an output format appropriate for the output device.

According to another embodiment of the present invention, there is provided a cooperative processing method using a cooperative system including an operation terminal and a cooperative processing device connected to each other. The cooperative system is connectable to a plurality of electronic devices. The cooperative processing system performs a cooperative process causing one of the plurality of electric devices to function as an input device to cause electronic data to be input therefrom and one of the plurality of electric devices to function as an output device to output the electronic data. In the cooperative processing method, input device information is obtained from the input device to specify the input device from the plurality of electronic devices, and output device information is obtained from the output device to specify the output device from the plurality of electronic devices by the operation terminal. Next, an input is controlled by causing the input device specified by the input device information to input electronic data therefrom through a first interface according to the input device information, and an output is controlled by causing the output device specified by the output device information to output the electronic data through a second interface according to the output device information in an output format appropriate for the output device.

Other objects, features and advantages of the present invention will become more apparent from the following detailed description when read in conjunction with the accompanying drawings.

BRIEF DESCRIPTION OF THE DRAWINGS

FIG. 10 is an image diagram illustrating an example of an input condition setting screen;

FIG. 12 is a configuration diagram illustrating an example of capability information of an input device;

FIG. 13 is a configuration diagram illustrating an example of capability information of an input device;

FIG. 14 is a flowchart illustrating an example of a processing procedure of an operation terminal of according to an embodiment of the present invention; and FIG. 15 is a configuration diagram illustrating an example of a setting item table for each device.

DETAILED DESCRIPTION OF THE PREFERRED EMBODIMENTS

A description is given, with reference to the accompanying drawings, of embodiments of the present invention.

[First Embodiment]

<System Configuration>

Figure 1:
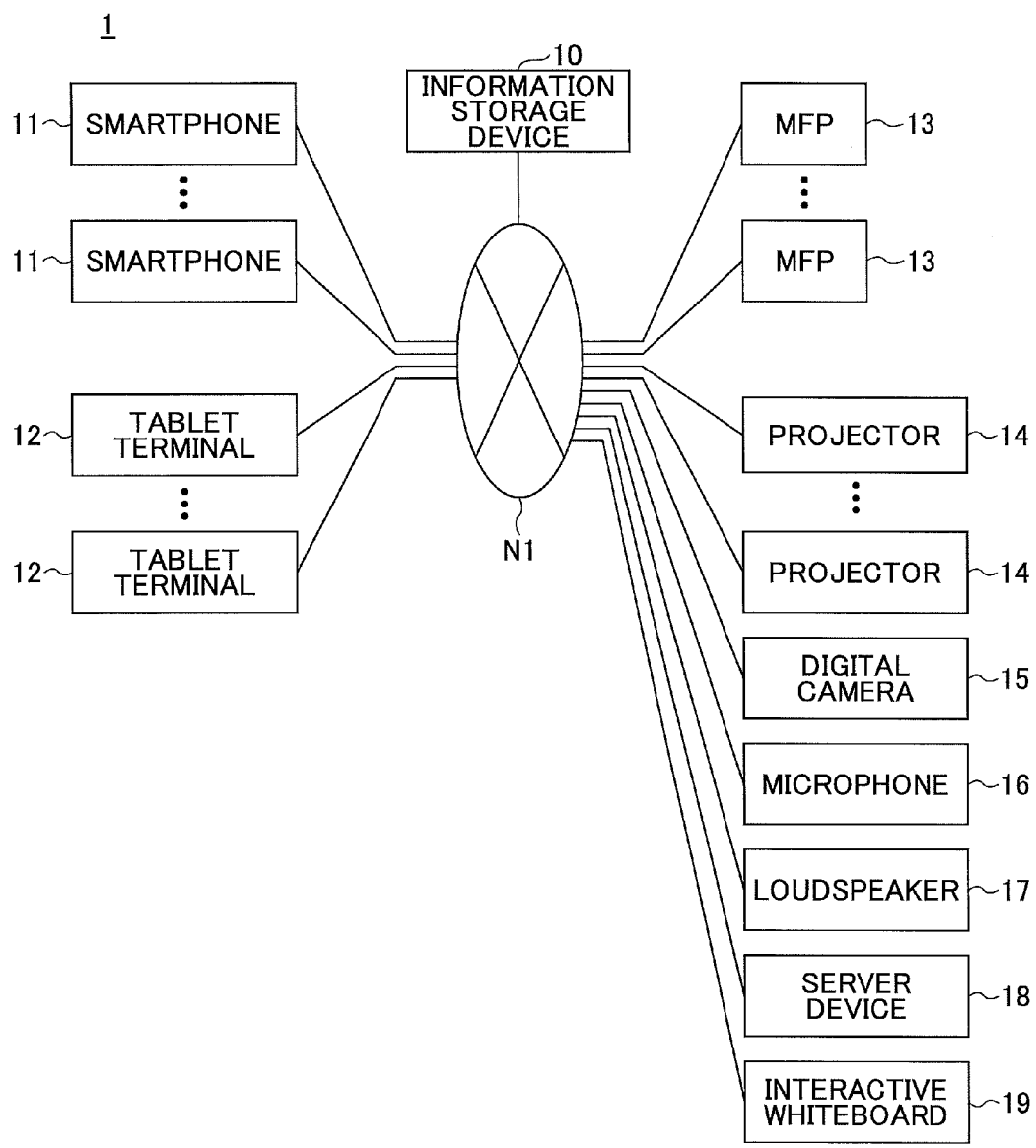
FIG. 1 is a configuration diagram illustrating an example of a cooperative system according to an embodiment of the present invention.

FIG. 1 is a configuration drawing of an example of a cooperative processing system according to an embodiment of the present invention. In the cooperative system 1 in FIG. 1, an information storage device 10 is connected to a network N1 such as a LAN (Local Area Network). Moreover, the cooperative processing system 1 includes one or more smartphone 11 and one or more tablet terminal 12 that are connected to the network N1. Furthermore, the cooperative processing system 1 includes one or more MFP (Multifunction Peripheral) 13 and one or more projector 14 that are connected to the network N1. In addition, a digital camera 15, a microphone 16, a loudspeaker 17 or a server device 18 or an interactive whiteboard 19 may be connected to the cooperative processing system 1. The cooperative processing system 1 is an example of a service providing system.

A private environmental network such as an intranet (office network) is available for the network N1. The smartphone 11 and the tablet terminal 12 are examples of an operation terminal that a user can carry and operate. The operation terminal may be a terminal device that a user can operate such as a mobile phone and a notebook PC (Personal Computer) in addition to the smartphone 11 and the tablet terminal 12.

The MFP 13 and the projector 14 are examples of electronic devices that input and output electronic data (e.g., printing, scanning, projection and the like). Moreover, the digital camera 15, the microphone 16 and the loudspeaker 17 are also examples of electronic devices that input and/or output electronic data. The electronic devices may be devices that input and/or output electronic data such as a printer, a scanner, a copier, a display and the like in addition to the MFP 13 and the projector 14. The display is an example of an image display device.

The MFP 13 is an example of an image forming device. The MFP 13 has an imaging function, an image forming function and a communication function, and can be used as a printer, a facsimile, a scanner and a copier. The MFP 13 has a Web browser function, and displays a UI (User Interface) by drawing HTML (Hyper Text Markup Language) data in the information storage device 10. Furthermore, the MFP 13 can receive a request such as printing and scanning from a user by running a Javascript (Trademark) program on the UI. The projector 14 is an example of an image projection device. The projector 14 has a projection function and a communication function. The projector 14 projects and outputs image data. The digital camera 15 is an example of an image taking device.

The microphone 16 and the loudspeaker 17 are examples of sound input and output devices. The server device 18 is an example of an apparatus that implements some process such a high functional process as the MFP 13 or the projector 14 cannot process, a process as a file server and the like. The interactive whiteboard 19 is an example of a device that displays electronic data such as image data and document data as an output, and creates electronic data such as image data and document data by receiving a writing input and the like from a user.

The information storage device 10 is an example of an information processing device. The information storage device 10 implements such a high functional process as the MFP 13 or the projector 14 cannot process, or a process as a file server. The information storage device 10 provides the input and/or output of electronic data by the electronic device such as the MFP 13 or the projector 14 as a service by cooperating with the operation terminal such as the smartphone 11 or the tablet terminal 12. The information storage device 10 may be configured to be dispersed to a plurality of computers.

<Hardware Configuration>

Figure 2:
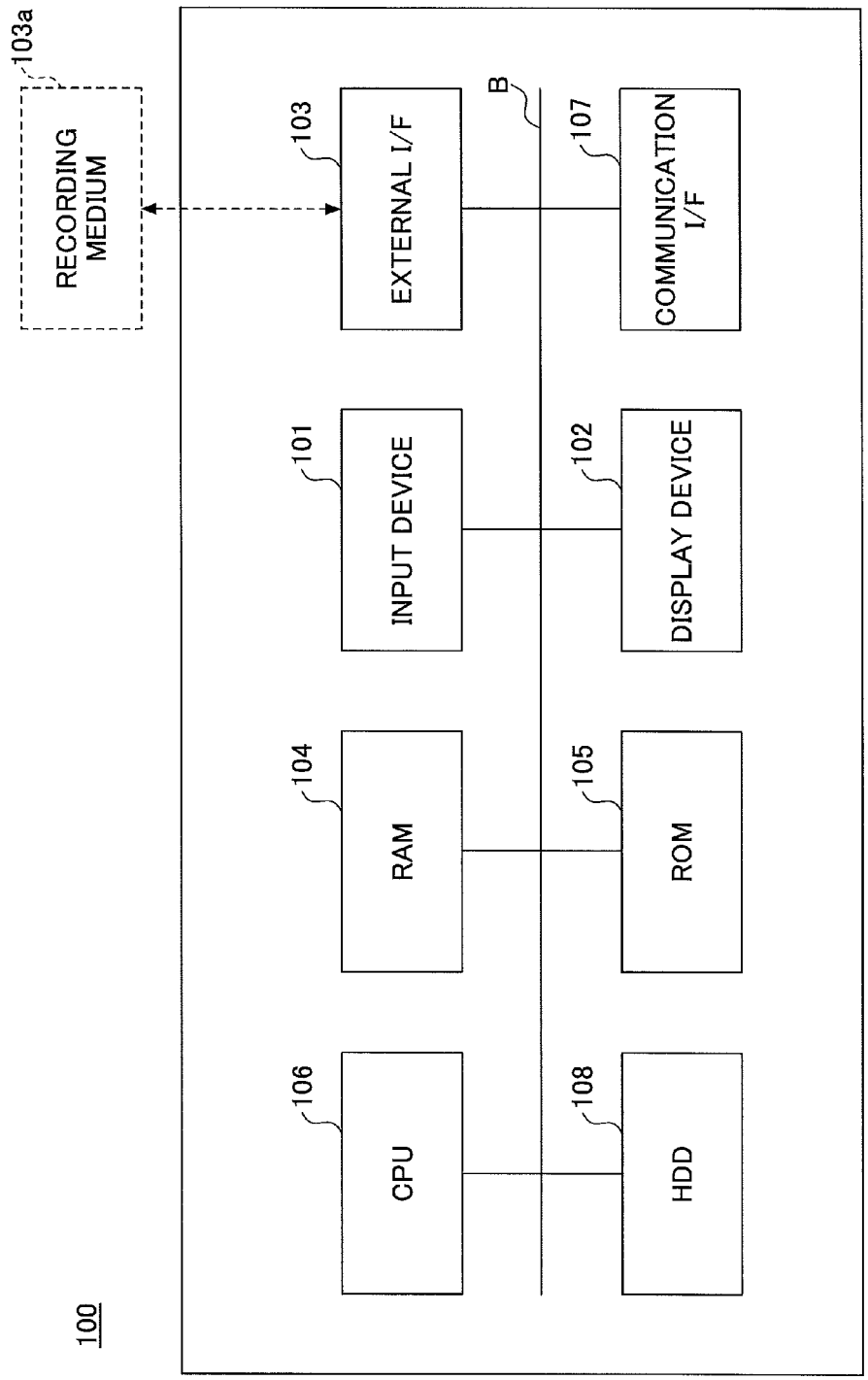
FIG. 2 is a hardware configuration diagram illustrating an example of a computer system according to an embodiment of the present invention.

The information storage device 10 is implemented by, for example, a computer system having a hardware configuration illustrated in FIG. 2. The operation terminal such as the smartphone 11 or the tablet terminal 12 is configured to include the hardware configuration illustrated in FIG. 2. FIG. 2 is a hardware configuration diagram of an example of the computer system of the present embodiment.

The computer system 100 in FIG. 2 includes an input device 101, a display 102, an external I/F 103, a RAM 104, a ROM 105, a CPU 106, a communication I/F 107 and an HDD 108, each of which is connected to each other by a bus B. The input device 101 includes a keyboard, a mouse and the like, and is used to input each manipulate signal to the computer system 100.

The display device 102 includes a display and the like, and displays processing results by the computer system 100. The communication I/F 107 is an interface that connects the computer system 100 to the network N1. This allows the computer system 100 to perform data communication with the operation terminal, the electronic device and the like through the communication I/F 107.

The HDD 108 is a non-volatile storage that stores a program and data. The program and the data includes an OS (Operating System) that is basic software to control the whole computer system 100, an application program that provides a variety of functions on the OS and the like. The HDD 108 manages the stored program and data by a predetermined file system and/or a DB (Data Base).

The external I/F 103 is an interface between the computer system 100 and an external device. The external device includes a recording medium 103a and the like. This enables the computer system 100 to read and/or write to the recording medium 103a through the external I/F 103. Here, the recording medium 103a includes a flexible disk, a CD (Compact Disc), a DVD (Digital Versatile Disk), an SD (Secure Digital) memory card, a USB (Universal Serial Bus) memory and the like.

The ROM 105 is a non-volatile semiconductor memory (storage device) that can retain a program and data even when the computer 100 is turned off. The ROM 105 stores a program and data such as a BIOS (Basic Input/Output System) that is executed when the computer 100 starts up, an OS setting, a network setting and the like. The RAM 104 is a volatile semiconductor memory (storage device) that holds a program and data temporarily.

The CPU 106 is an arithmetic device that implements control or a function of the whole computer system 100 by reading the program and data from the storage device such as the ROM 105 or the HDD 108 on the RAM 104 and by executing the process.

The computer system 100 of the present embodiment can implement a variety of processes by causing the hardware resource and the program to cooperate with each other by combining the above hardware resource, the program and the data.

Figure 3:
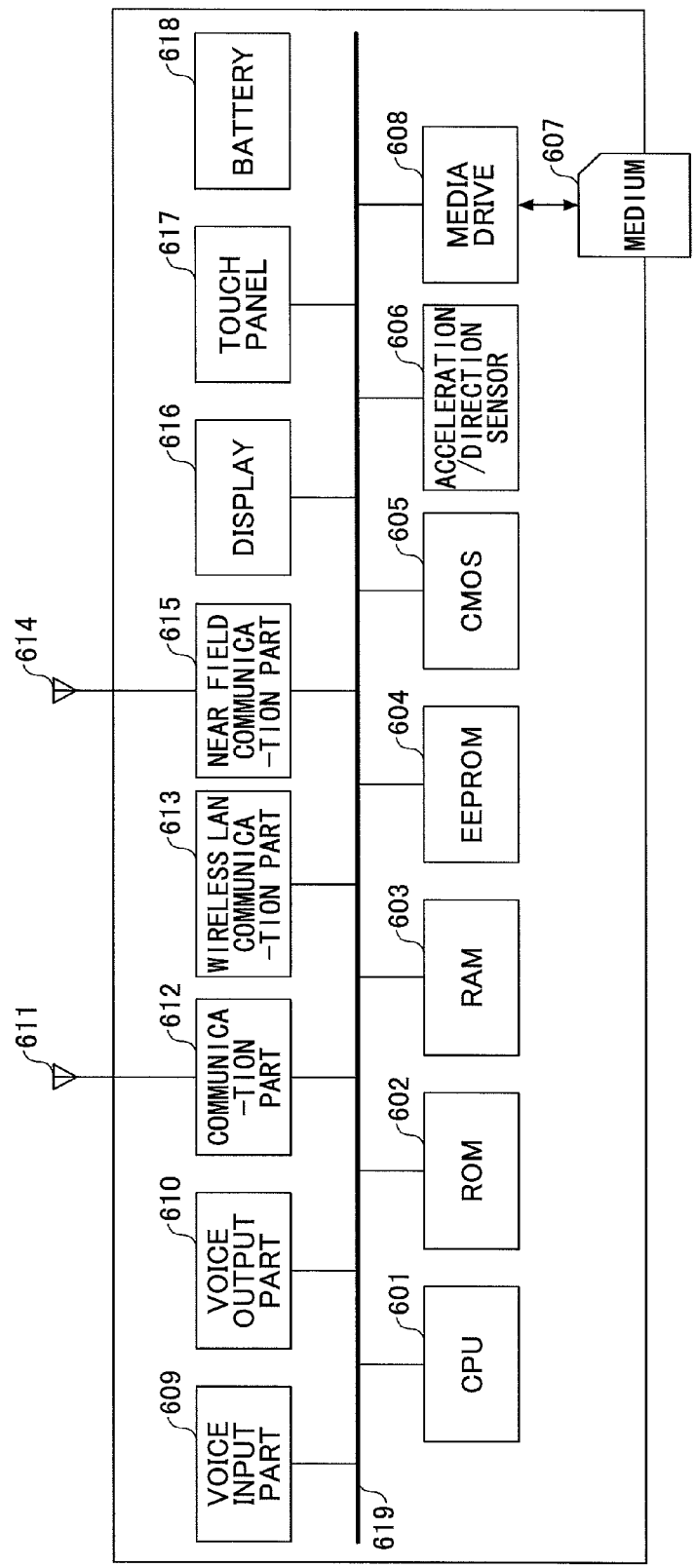
FIG. 3 is a hardware configuration diagram illustrating an example of an operation terminal according to an embodiment of the present invention.

The operation terminal such as the smartphone 11 or the tablet terminal 12 is, for example, implemented by a hardware configuration illustrated in FIG. 3. FIG. 3 is a hardware configuration diagram illustrating an example of the operation terminal of the present embodiment. The operation terminal in FIG. 3 includes a CPU 601, a ROM 602, a RAM 603, an EEPROM 604, a CMOS sensor 605, an acceleration/direction sensor 606, a media drive 608.

The CPU 601 controls the whole operation of the operation terminal. The ROM 602 stores a basic input and output program. The RAM 603 is used as a work area of the CPU 601. The EEPROM 604 reads or writes data in accordance with the control of the CPU 601. The CMOS sensor 605 takes an image of an object of shooting in accordance with the control of the CPU 601 and obtains image data. The acceleration/direction sensor 606 is, for example, an electromagnetic compass, a gyrocompass, an acceleration sensor and the like.

The media drive 608 controls reading or writing (storing) data to a recording medium 607 such as a flash memory. The media drive 608 is configured to be able to receive and eject the recording medium 607 that stores readable data having been already recorded therein or stores new data to be written therein.

Here, the EEPROM 604 stores association information and the like necessary for an OS executed by the CPU 601 and network setting. An application to implement various processes in the embodiments of the present invention is stored in the EEPROM 604, the recording medium 607 or the like.

Moreover, the CMOS sensor 605 is an electric charge coupling device that digitizes an image of an object of shooting by converting light to an electric charge. As long as the CMOS 605 can image the object of shooting, for example, the CMOS 605 can be replaced by a CCD (Charge Coupled Device) sensor.

Furthermore, the operation terminal includes a voice input part 609, a voice output part 610, an antenna 611, a communication part 612, a wireless LAN communication part 613, a short-range wireless communication antenna 614, a short-range wireless communication part 615, a display 616, a touch panel 617, and a bus line 619.

The voice input part 609 converts a voice to a voice signal. The voice output part 610 converts a voice signal to a voice. The communication part 612 communicates with the nearest base station device by a wireless communication signal by using the antenna 611. The wireless LAN communication part 613 communicates with an access point by wireless LAN communication conforming to the IEEE 80411 standard. The short-range wireless communication part 615 performs a short-range wireless communication (Bluetooth (Trademark) communication) using the short-range wireless communication antenna 614.

The display 616 is made of a liquid crystal display, organic EL (Electroluminescence) display or the like that displays an image of the object of shooting and a variety of icons. The touch panel 671 is placed on the display 616, constituted of a sensitive type or electrostatic type panel, and detects a touched position on the display 616 based on a touch by a finger, a touch pen or the like. The bus line 619 is an address bus, a data bus or the like to electrically connect each part with each other.

In addition, the operation terminal includes a dedicated battery 618. The operation terminal is driven by the battery 618. The voice input part 609 includes a microphone to allow a voice to be input. The voice output part 610 includes a loudspeaker to output a voice.

Thus, the operation terminal of the present embodiment can implement a variety of processes as described later by the above hardware configuration.

<Software Configuration>
<<Information Storage Device 10>>

Figure 4:
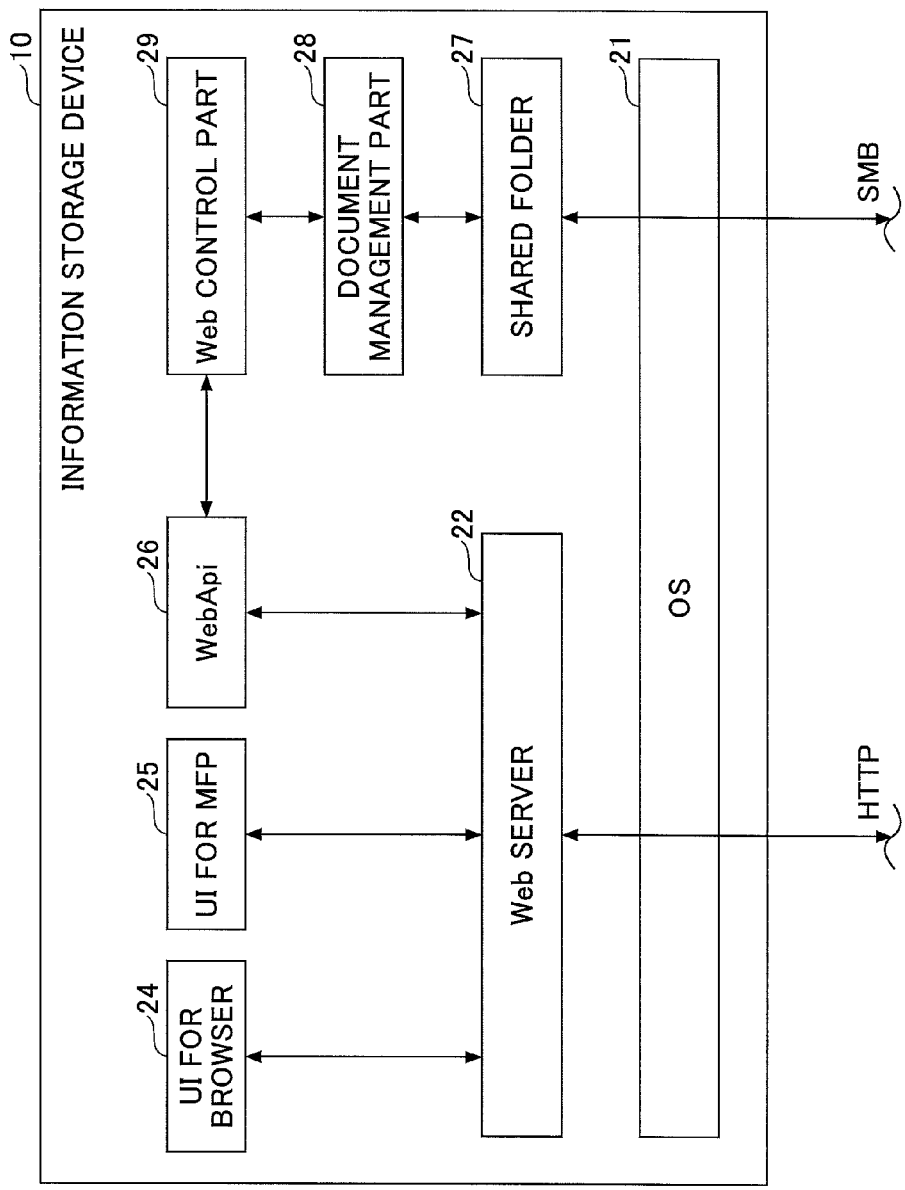
FIG. 4 is a processing block diagram illustrating an example of an information storage apparatus according to an embodiment of the present invention.

The information storage device 10 of the present embodiment is implemented by, for example, a processing block as illustrated in FIG. 4. FIG. 4 is a processing block diagram of an example of the information storage device of the present embodiment. The information storage device 10 implements an OS 21, a Web server 22, a UI for PC browser 24, a UI for MFP 25, a WebApi 26, a shared folder 27, a document management part 28 and a Web control part 29 by running a program.

The OS 21 is an operating system of the information storage device 10, and controls the whole system. The OS 21 is, for example, Windows (Trademark), Linux (Trademark) or the like.

The Web server 22 is software that sends and receives information by HTTP (Hyper Text Transfer Protocol). The Web server 22 is Apache Tomcat (Trademark), IIS (Trademark) or the like.

The UI for PC browser 24 displays a system setting screen on the operation terminal by a HTTP request. A user can change the setting from the system setting screen by using a Web browser (not shown in the drawing).

The UI for MFP 25 displays a screen of QR code (Trademark), an example of code information, on the electronic device such as the MFP 13 in accordance with the HTTP request. The QR code is a matrix type two-dimensional code. Moreover, the UI for MFP 25 displays a print screen and a scanning screen by the HTTP request. The user can perform printing and scanning operation by utilizing the Web browser function of the MFP 13.

The WebApi (Application Programming Interface) 26 is available through the network N1. The WebApi 26 receives the HTTP request, performs a process in accordance with the HTTP request, and performs an HTTP response. The WebApi 26 also creates the QR code.

The WebApi 26 is a preliminarily defined interface provided to receive a request from the operation terminal such as the smartphone 11 and the tablet terminal 12, and is, for example, constituted of a function, a class or the like.

Furthermore, the WebApi 26 of the information storage device 10 can be provided for a developer of an application installed in the operation terminal as an SDK (Software Development Kit). The application developer can develop the application by using the SDK. The SDK can be provided for a third vendor other than the provider of the information storage device 10. The third vendor can develop an application by using the provided SDK. The application developed by using the SDK can be installed into the operation terminal.

By providing the WebApi of the information storage device 10 as the SDK, the operation terminal can install not only the application developed by the provider of the information storage device 10, but also the application developed by the third vendor.

The shared folder 27 is a folder published on the network N1 by a SMB (Server Message Block) protocol. A user can access to the shared folder 27 by using the operation terminal such as the smartphone 11 or the tablet terminal 12.

The document management part 28 manages a file put in the shared folder, and performs a process of converting data in response to a request from the Web control part 29. Here, the file in the present embodiment is one form of electronic data. The Web control part 29 performs a process of controlling the document management part 28 in response to a request from the WebApi 26.

Here, there are roughly divided into two processes running in the information storage device 10. One process functions as the Web server 22, the UI for PC browser 24, the UI for MPF 25 and the WebApi 26. Another process functions as the shared folder 27, the document management part 28 and the Web control part 29. Accordingly, the WebApi 26 and the Web control part 29 perform interprocess communication.

<<Operation Terminal 30>>

Figure 5:
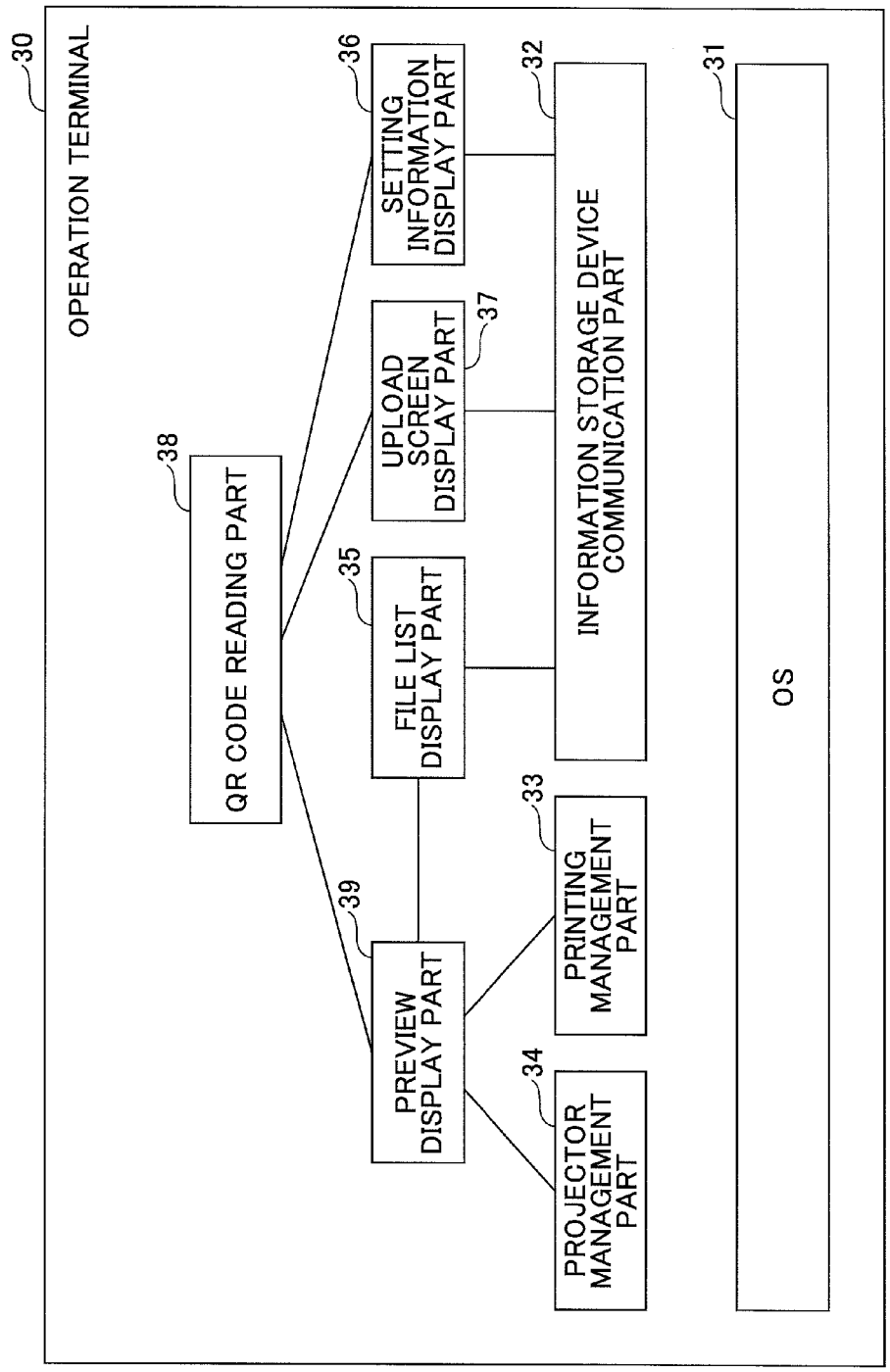
FIG. 5 is a processing block diagram illustrating an example of an operation terminal according to an embodiment of the present invention.

The operation terminal 30 of the present embodiment is, for example, implemented by a processing block illustrated in FIG. 5. FIG. 5 is a processing block diagram of an example of the operation terminal of according to the present embodiment. The operation terminal 30 implements an OS 31, an information storage device communication part 32, a printing management part 33, a projector management part 34, a file list display part 35, a setting information display part 36, an upload screen display part 37, a QR code reading part 38 and a preview display part 39 by running a program.

The OS 31 is an operating system of the operation terminal 30. The OS 31 is, for example, iOS (Trademark), Android (Trademark) or the like that controls the whole system.

The information storage communication part 32 sends and receives information to and from the WebApi 26 of the information storage device 10 by the HTTP. In addition, the information storage device communication part 32 can access the shared folder 27 of the information storage device 10 by the SMB.

For example, the file list display part 35, the setting information display part 36 and the upload screen display part 37 obtains electronic data or information from the information storage device 10 or requests a process to the information storage device 10 by utilizing the information storage device communication part 32.

The file list display part 35 displays a list of files in the information storage device 10, and receives selection of a file from a user. The setting information display part 36 performs a connection setting with the information storage device 10, and/or displays the setting information of the operation terminal 30. The upload screen display part 37 displays a menu for uploading a file to the information storage device 10, and uploads the file to the information storage device 10.

For example, there is a method of reading the QR code on the MFP 13 and uploading the file to the information storage device 10 by causing the MFP 13 to scan the file as an uploading method to the information storage device 10.

Moreover, for example, there is a method of uploading the data of the operation terminal 30 to the information storage device 10 as an uploading method to the information storage device 10. Furthermore, for example, there is a method of uploading picture data taken by a camera function of the operation terminal 30 as an uploading method to the information storage device 10.

When a user selects a file from the list of the files displayed by the file list display part 35, the preview display part 39 previews the selected file. In addition, the preview display part 39 displays a menu of projection and/or printing. The projector management part 34 performs search and registration of the projector 14, and a process of causing the projector 14 to project the selected file. The printing management part 33 performs search and registration of the MFP 13, and a process of causing the MFP 13 to print the selected file.

When the operation terminal 30 reads the QR code, the QR code reading part 38 is utilized by the preview display part 39, the setting information display part 36 and the upload screen display part 37. The QR code that the QR code reading part 38 reads includes a QR code for connecting the operation terminal 30 to the information storage device 10, a QR code for specifying the MFP 13 to be caused to print or scan, a QR code for specifying the projector to be caused to project and the like.

<Details of Process>

Detailed description is given below of a process by the cooperative processing system 1 according to the present embodiment.

More specifically, a description is given below of a process when causing data to be input from an input device 40 and the input data to be output by an output device 50. FIG. 5 is a sequence diagram of an example of illustrating a processing procedure of a cooperative processing system of the present embodiment.

In step S1, a user operates the input device 40 to allow the user to input data, and requests the input device to display a QR code screen. In step S2, the input device 40 displays the QR code screen including a QR code. The QR code displayed by the input device 40 includes input device information (e.g., an IP address and capability information of the input device 40) for specifying the input device 40. Here, the capability information only has to be information from which an interface or a function that the input device 40 retains can be determined. The capability information may be an ID of the input device 40 or a character string formed by listing the interface or the function retained by the input device 40. The IP address functions as connection information to be connected to the input device 40.

In step S3, the user operates the output device 50 to output data, and requests the output device 50 to display a QR code. In step S4, the output device 50 displays a QR code screen including the QR code. The QR code displayed by the output device 50 includes output device information (e.g., an IP address and capability information of the output device 50) for specifying the output device 50. Here, the capability information only has to be information from which an interface or a function that the output device 50 retains can be determined. The capability information may be an ID of the output device 50 or a character string formed by listing the interface or the function retained by the output device 50. The IP address functions as connection information to be connected to the output device 50.

Figure 6:
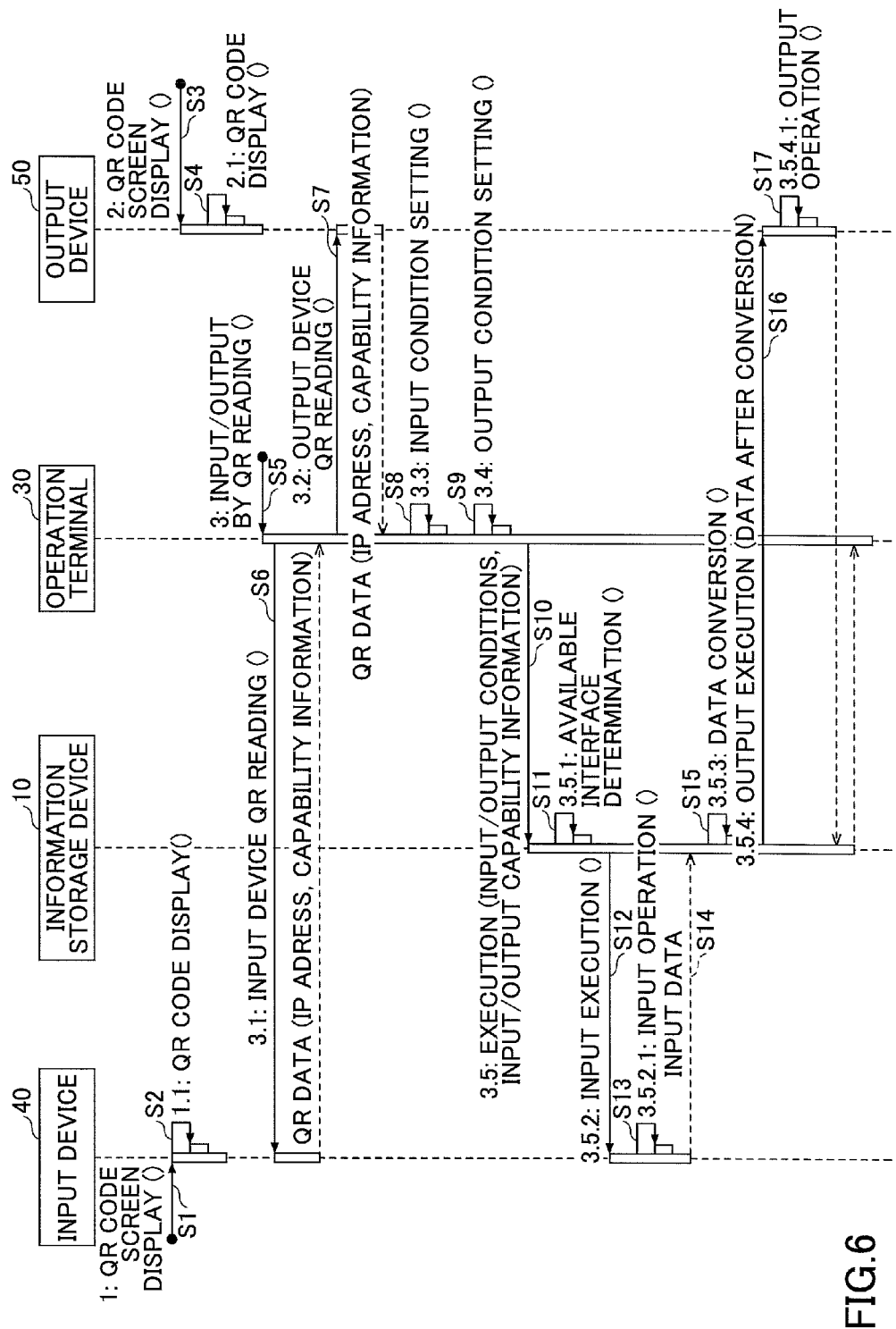
FIG. 6 is a sequence diagram illustrating an example of a processing procedure of a cooperative processing system according to an embodiment of the present invention.

Here, a description is given of an example of displaying the QR code screens including the QR codes in the sequence diagram in FIG. 6, but for example, a QR code preliminarily printed on a sheet of paper and the like and attached to a casing may be available.

Figure 7:
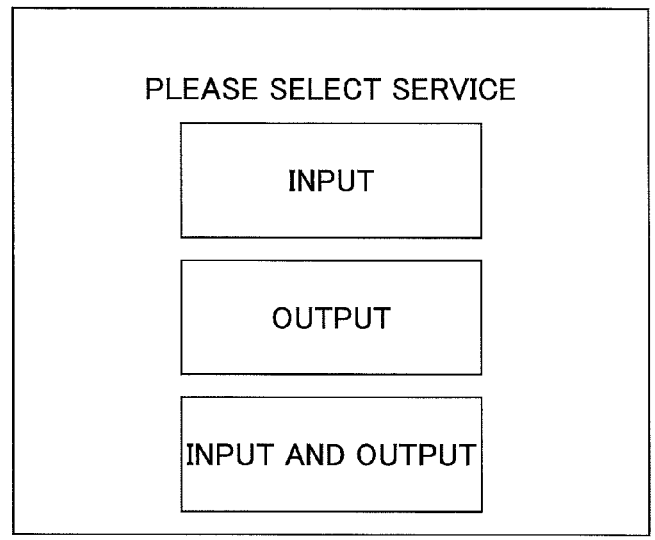
FIG. 7 is an image diagram illustrating an example of a service list screen.

In step S5, the user operates the operation terminal 30, and selects input and output as a service to be utilized, for example, from a screen illustrated in FIG. 7. FIG. 7 is a schematic diagram of an example of a service list screen. One of the services of the input, the output, and the input and output is selected by the user from the service list screen of FIG. 7 on the operation terminal 30.

The operation terminal 30 determines that the service selected by the user is the input and output, and that the IP address, the capability information and input and output conditions of the input device 40 and the output device 50 are information necessary for the input and output service.

Figure 8:
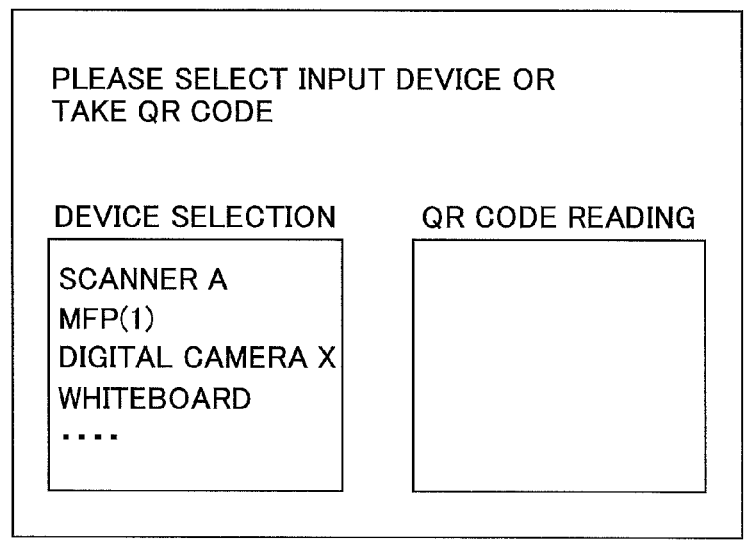
FIG. 8 is an image diagram illustrating a selection screen of an input device.

To begin with, the operation terminal 30 displays a selection screen of the input device 40 illustrated in FIG. 8, and requests the user to specify the input device 40. FIG. 8 is a schematic diagram of an example of the selection screen of the input device 40. The operation terminal 30 receives the selection of the input device 40 by the user from the selection screen of the input device 40. For example, the user operates the operation terminal 30 and requests the operation terminal 30 to read the QR code of the input device 40. Here, as illustrated in FIG. 8, the user may select the input device 40 from a device list displayed on the selection screen of the input device 40.

In response to the request of reading the QR code from the user, the operation terminal 30 takes a picture of the QR code by using a camera function in step S6 (see FIG. 6), and reads the QR code. The operation terminal 30 obtains the IP address and the capability information of the input device 40 from the QR code.

Next, the operation terminal 30 displays a selection screen of the output device 50 similar to the selection screen of the input device 40, and requests the user to specify the output device 50. The operation terminal 30 receives the selection of the output device 50 by the user from the selection screen of the output device 50.

Figure 9:
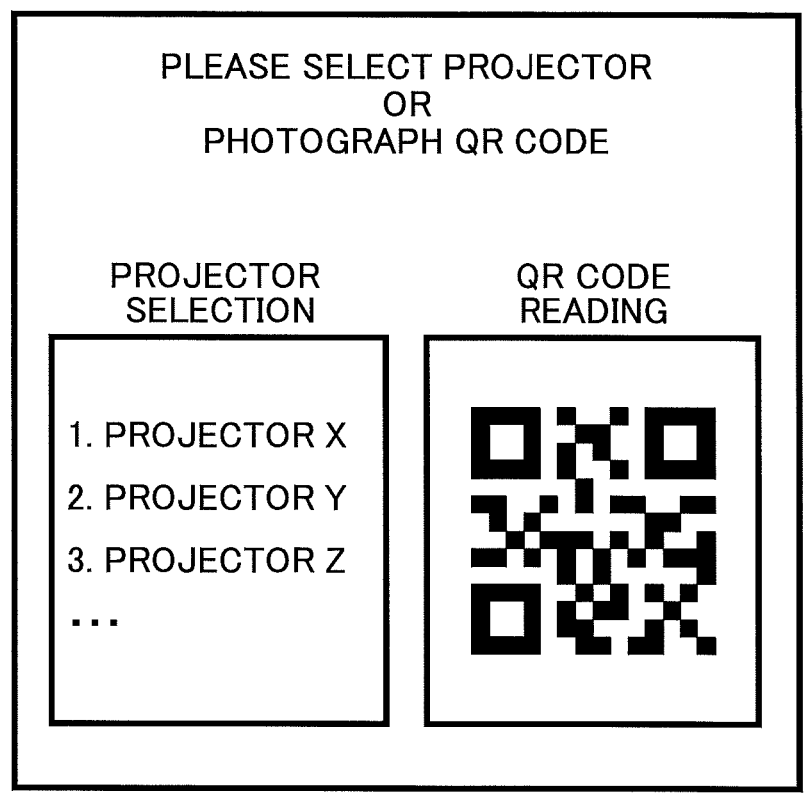
FIG. 9 is an image diagram illustrating an example of a selection screen of an output device.

For example, the user operates the operation terminal 30 and requests the operation terminal 30 to read the QR code of the output device 50 to specify the output device 50. In response to the request of reading the QR code from the user, the operation terminal 30 takes a picture of the QR code by using a camera function in step S7, and reads the QR code. The operation terminal 30 obtains the IP address and the capability information of the output device 50 from the QR code. Here, as illustrated in FIG. 9, the user may select the output device 50 from a device list displayed on a selection screen of the output device 50, or may select the output device 50 by reading the QR code.

In step S8, the operation terminal 30 displays an input condition setting screen illustrated in FIG. 10 to specify input conditions of the input device 40 selected by the user. FIG. 10 is a schematic diagram illustrating an example of the input condition setting screen. The operation terminal 30 receives the setting of the input conditions from the input condition setting screen by the user. Here in FIG. 10, the input condition setting screen receives a setting of reading (scanning) conditions as an example of the input conditions.

Figure 11:
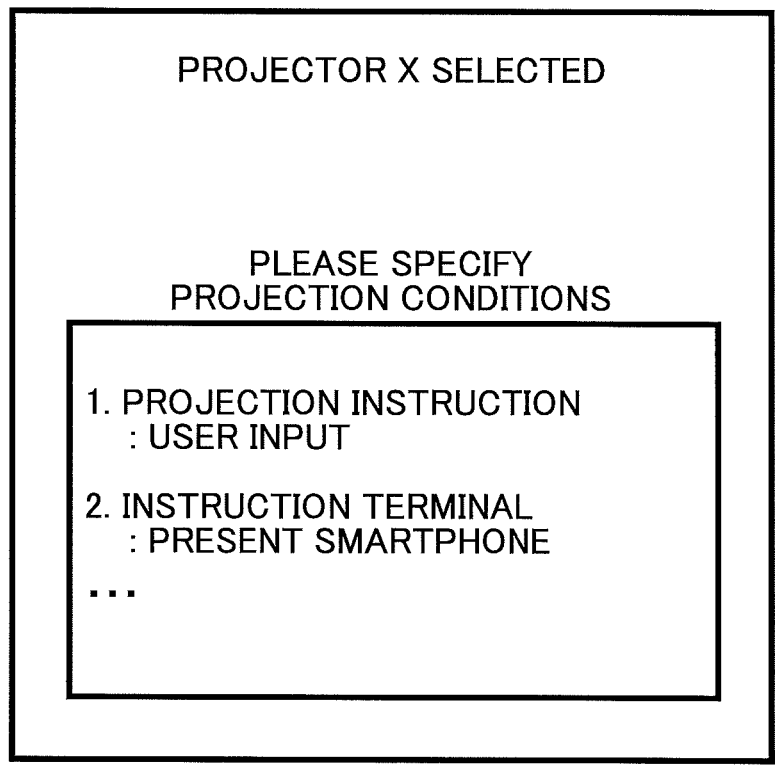
FIG. 11 is an image diagram illustrating an example of an output condition setting screen.

In step S9, the operation terminal 30 displays an output condition setting screen that sets output conditions of the output device 50 selected by the user and is similar to the input condition setting screen in FIG. 11. The operation terminal 30 receives a setting of the output conditions from the output condition setting screen by the user.

In step S10, the operation terminal 30 sends the input device information and the output device information set by the user to the information storage device 10, and requests execution of the input and output service. Here, the input device information includes the capability information, the IP address and the input conditions of the input device 40. The output device information includes the capability information, the IP address and the output conditions of the output device 50.

In step S11, the information storage device 10 confirms an interface utilized by the input device 40 and a file format available for the input device 40 from the capability information included in the input device information as illustrated in FIG. 12.

Moreover, the information storage device 10 confirms an interface utilized by the output device 50 and a file format available for the output device 50 from the capability information included in the output device information as illustrated in FIG. 13. Then, the information storage device 10 determines the interface available for the input device 40 and the output device 50. In addition, the information storage device 10 determines a file format to be utilized based on the format available for the input device 40 and the output device 50 and further determines whether data conversion is necessary or not.

Here, when there is a plurality of interfaces available for the input device 40 and the output device 50, the interface to be utilized may be determined by preliminarily established priority or the like. When there is a plurality of file formats that the input device 40 and the output device 50 can handle, the information storage device 10 may determine the file format to be used by the input device 40 and the output device 50 by preliminarily established priority or the like.

In step S12, the information storage device 10 provides an input instruction according to the input conditions for the input device 40 by way of the interface determined to be used in step S11. Upon receiving the input instruction from the information storage device 10, the input device 40 executes an input process according to the input conditions in step S13. After finishing the input process, the input device 40 sends obtained input data to the information storage device 10 as input process results in step S14 to the information storage device 10.

In step S15, the information storage device 10 converts the input data received from the input device 40 to the file format of the output device 50 that the information storage device 10 has determined to use in step S11.

In step S16, the information storage device 10 provides an output instruction according to the output conditions for the output device 50 by way of the interface determined to be used in step S11. Upon receiving the output instruction from the information storage device 10, the output device 50 executes an output process according to the output conditions in step S17.

Here, a description is given below of a process of the operation terminal 30 in steps S5 through S9 by using a flowchart describing the process in detail illustrated in FIG. 14.

The operation terminal 30 displays a screen such as FIG. 7, and allows the user to select a service the user wants to use from the displayed screen (step S31). Next, the operation terminal determines whether the selected service is the input service or not (step S32).

When the selected service is the input service (step S32: YES), the operation terminal 30 obtains capability information of the input device 40 by taking a picture of the QR code displayed on (or attached to) the input device 40 (step S33). Furthermore, the operation terminal 30 displays an input condition setting screen as illustrated in FIG. 10 to set input conditions of the input device 40 selected by the user, and receives an input of the input conditions from the user (step S34).

With respect to the output conditions, for example, the operation terminal 30 may preliminarily store the conditions set for each device as illustrated in FIG. 15, and may display setting items corresponding to the capability information of the output device 50 having been obtained in step S33 as the setting items of the output conditions. Moreover, the capability information of the output device 50 having been obtained in step S33 may include the setting items of the output conditions, and the operation terminal 30 may display the setting items contained in the obtained capability information of the output device 50. The operation terminal 30 sends the capability information that the operation terminal 30 has obtained in step S37 and the input conditions that the operation terminal 30 has accepted as the input in step S38 to the information storage device 10 (step S39).

When the selected service is not the output service (step S36: NO), the operation terminal 30 obtains capability information of the input device 40 similarly to step S33 (step S40). Next, the operation terminal 30 obtains the capability information of the output device 50 similarly to step S37 (step S41). Subsequently, the operation terminal 30 receives the setting of the input conditions similarly to step S34 (step S42). Next, the operation terminal 30 receives the setting of the output conditions similarly to step S38 (step S43).

After that, the operation terminal 30 sends the capability information that the operation terminal 30 has obtained in steps S40 and S41, and the input conditions and the output conditions that the operation terminal 30 has accepted in steps S42 and S43, respectively, to the information storage device 10 (step S44).

<<Other Process Procedure of Cooperative Processing System 1>>

The cooperative processing system 1 of the present embodiment is not limited to the above. A variety of configurations can be implemented such as a configuration of providing an input and output instruction for the input and output device 40, 50 from the information storage device 10 by way of the operation terminal 30, a configuration of the operation terminal 30 converting the input data, and a configuration of sending the output data to the output device 50 by way of the output device 50.

Moreover, capability information of an electronic device may contain information of interfaces corresponding to the electronic device, and the information storage device 10 may determine an interface to connect with the electronic device based on received capability information.

<Conclusion>

As described above, according to the cooperative processing system 1 of embodiments of the present invention, a user can obtain information to specify an electronic device such as a QR code by passing the operation terminal 30 such as the smartphone 1 or the tablet terminal 12 over the electronic device such as the MFP 13 or the projector 14. The user can readily specify an electronic device to input electronic data and an electronic device to output electronic data from a plurality of electronic devices. The information storage device 10 can determine an interface to be utilized by the electronic device to input the electronic data and the electronic device to output the electronic data, and can control the electronic devices through the interface.

Accordingly, according to the cooperative processing system 1 of the embodiments of the present invention, the user can provide a variety of services by causing the operation terminal 30 and an information processing device such as the information storage device 10 to cooperate to control one or more electronic device.

Thus, according to the embodiments of the present invention, a plurality of services can be provided by cooperating one or more electronic device among a plurality of electronic devices.

The present invention is not limited to the specifically disclosed embodiments, and variations and modifications may be made without departing from the scope of the present invention. For example, an obtaining unit recited in claims corresponds to the setting information display part 36 and the QR code reading part 38. In addition, for example, an available interface determination unit and a data conversion necessity determination unit correspond to the WebApi 26. For example, a cooperative processing device corresponds to the information storage device 10.

The present application is based on and claims the benefit of priority of Japanese Priority Patent Application No. 2013-100634, filed on May 10, 2013, and Japanese Priority Patent Application No. 2014-90952, filed on Apr. 25, 2014, the entire contents of which are incorporated herein by reference.

What is claimed is:

1. A cooperative processing system including an operation terminal and a cooperative processing device connected to each other, the cooperative processing system being connectable to a plurality of electronic devices, the cooperative processing system performing a cooperative process causing one of the plurality of electric devices to function as an input device to cause electronic data to be input therefrom and one of the plurality of electric devices to function as an output device to output the electronic data, the cooperative processing system comprising:

an obtaining unit provided in the operation terminal and configured to obtain input device information from the input device to specify the input device from the plurality of electronic devices and output device information from the output device to specify the output device from the plurality of electronic devices;

an input control unit configured to cause the input device specified by the input device information to input the electronic data therefrom through a first interface according to the input device information; and an output control unit configured to cause the output device specified by the output device information to output the electronic data through a second interface according to the output device information in an output format appropriate for the output device, wherein the input device information contains first connection information to connect the cooperative processing system to at least one electronic device specified by the input device information and first information to determine the first interface retained by the at least one electronic device, and the output device information contains second connection information to connect the cooperative processing system to at least one electronic device specified by the output device information and second information to determine the second interface retained by the at least one electronic device.

2. The cooperative processing system of claim 1, further comprising:

a utilizing interface determination unit configured to determine the first and second interfaces to be utilized by the input device and the output device based on the first and second information to determine the first and second interfaces retained by the electronic devices.

3. The cooperative processing system of claim 2, wherein the input device information further contains information to determine a first data format that the electronic device specified by the input device information can handle, and the output device information further contains information to determine a second data format that the electronic device specified by the output device information can handle, and the system further comprising:

a data conversion necessity determination unit configured to determine whether data conversion of the electronic data to be caused to be input by the input control device is necessary or not based on the first and second data formats that the electronic device can handle.

4. The cooperative processing system of claim 1, wherein the obtaining unit obtains the input device information and the output device information to specify the electronic device from image data taken by the operation terminal.

5. A cooperative processing method using a cooperative system including an operation terminal and a cooperative processing device connected to each other, the cooperative system being connectable to a plurality of electronic devices, the cooperative processing system performing a cooperative process causing one of the plurality of electric devices to function as an input device to cause electronic data to be input therefrom and one of the plurality of electric devices to function as an output device to output the electronic data, the cooperative processing method comprising steps of:

obtaining input device information from the input device to specify the input device from the plurality of electronic devices and output device information from the output device to specify the output device from the plurality of electronic devices by the operation terminal;

controlling an input by causing the input device specified by the input device information to input the electronic data therefrom through a first interface according to the input device information; and controlling an output by causing the output device specified by the output device information to output the electronic data through a second interface according to the output device information in an output format appropriate for the output device, wherein the input device information contains first connection information to connect the cooperative processing system to at least one electronic device specified by the input device information and first information to determine the first interface retained by the at least one electronic device, and the output device information contains second connection information to connect the cooperative processing system to at least one electronic device specified by the output device information and second information to determine the second interface retained by the at least one electronic device.

\* \* \* \* \*